(12) United States Patent
Vitaterna et al.

(10) Patent No.: US 11,874,639 B2
(45) Date of Patent: Jan. 16, 2024

(54) AUDITOR SYSTEM AND METHOD FOR A BUILDING MANAGEMENT SYSTEM ENVIRONMENT

(71) Applicant: Siemens Industry, Inc., Alpharetta, GA (US)

(72) Inventors: Joseph F. Vitaterna, Northbrook, IL (US); Steven Tattleman, Northbrook, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 5 days.

(21) Appl. No.: 17/819,360

(22) Filed: Aug. 12, 2022

(65) Prior Publication Data

US 2022/0382231 A1    Dec. 1, 2022

Related U.S. Application Data

(63) Continuation of application No. 16/414,557, filed on May 16, 2019, now Pat. No. 11,449,019.

(51) Int. Cl.
| | |
|---|---|
| *G06F 16/27* | (2019.01) |
| *G05B 15/02* | (2006.01) |
| *G06F 9/451* | (2018.01) |

(52) U.S. Cl.
CPC .......... *G05B 15/02* (2013.01); *G06F 16/27* (2019.01); *G06F 9/451* (2018.02)

(58) Field of Classification Search
CPC ........ G06F 21/10; G06Q 30/02; G16H 40/40; H04W 4/70
See application file for complete search history.

(56) References Cited

U.S. PATENT DOCUMENTS

| | | | | |
|---|---|---|---|---|
| 11,449,019 | B2* | 9/2022 | Vitaterna | G06F 16/27 |
| 2012/0324119 | A1* | 12/2012 | Imes | F24F 11/79 |
| | | | | 709/227 |
| 2016/0335731 | A1* | 11/2016 | Hall | G06Q 10/067 |
| 2018/0328612 | A1* | 11/2018 | Sinha | H04L 63/0442 |

FOREIGN PATENT DOCUMENTS

EP              3460690 A1 *  3/2019  ............. G06Q 10/06

* cited by examiner

*Primary Examiner* — Patrick McAtee
*Assistant Examiner* — Nakia Leffall-Allen

(57) ABSTRACT

There is described an auditor system and method for a building management system environment comprising a blockchain component and an alarm remediation and auditing device. The blockchain component provides communication between the auditor system and a network of peer-to-peer nodes. The alarm remediation and auditing device provides interaction between the auditor system and one or more user, wherein the alarm remediation and auditing device is further configured to process building information associated with a selected remediation type received from the blockchain component as well as requirement for regulatory compliance. The auditor system performs an audit of transaction records of the decentralized ledger relating to the remediation type without providing any new transaction records to the decentralized ledger that relate to the remediation types of the building automation system and do not relate to the audit.

16 Claims, 10 Drawing Sheets

AUDITOR SYSTEM AND METHOD FOR A BUILDING MANAGEMENT SYSTEM ENVIRONMENT

RELATED APPLICATIONS

This application is a continuation of U.S. patent application Ser. No. 16/414,557, titled Alarm Issue Management for a Building Management Environment, by Joseph F. Vitaterna, et al. filed on May 16, 2019, and incorporated by reference in its entirety.

FIELD OF THE INVENTION

Aspects of the present invention generally relate to building management system environments and, more particularly, systems and methods for building automation systems, service providers, and auditors of a building management system environment.

BACKGROUND

Building automation systems provide the capability of managing many building management components from a central front-end interface or group of interfaces. These building management components include building equipment for lighting, power, heating, ventilation, air conditioning, fire safety, and security. The building automation systems offer operational and sustainability benefits for building developers, managers, and occupants.

Building automation systems may have alarm management systems for safe and effective operation of a building. An alarm management system may include hardware and software to detect alarm states and report the alarm states to building operators. Alarm management systems may include more advanced features such as recording the alarm states, monitoring changes in the alarm states, and comparing the alarm system performance against predetermined goals of the system. In some countries, the alarm management system must meet the requirements of government regulations so the appropriate regulatory agency may audit the alarm management system to ensure compliance.

Building automation systems may be part of a building management system environment that is a larger community of building management entities. Building management system environment may include various parties such as building owners, tradespeople, and regulatory agencies. Building owners often manage building automation systems for one or more buildings, and tradespeople provide services to building owners for upgrading and maintaining the buildings. Regulatory agencies may audit alarm management systems on a periodic basis to check safe and reliable compliance with government and/or international standards. Non-government entities may also audit alarm management systems to develop and improve the systems and the performance of personnel working with the systems. Audit compliance is a management station function if a building automation system in which only users of the management station may participate in alarm corrective action. For this reason, sites with no management station have no access to this functionality.

Existing processes for maintaining and auditing building assets are inefficient and cumbersome. Existing systems are typically open to only users of management stations in which the users are required to connect with a central operator station for accessing and creating transactions and events. Also, handoffs at the central operator station are executed manually and, thus, inefficient. Further, auditors and regulators who need to gather information manually need to invest a lot of time and effort to investigate regulatory compliance by a building automation system or similar system.

Parties of a building management system environment may face significant costs for providing supplier services, component services, and auditing services. These parties are subjected to constant downward price pressures for delivery of services for addressing issues associated with alarm management systems, particularly the high cost of skilled labor. Certain corrective actions may be performed by less-skilled labor or automation, and detailed records of available and desirable service providers would be helpful to match the best labor or automation to the issues to be addressed. However, historical records of actions taken by subcontractors and other service providers can be difficult to collate and present in an organized and consistent manner, particularly where there is a lack of trust by parties to participate in the building management system environment.

SUMMARY

Briefly, there are described an alarm information management system of a building management system environment for participation by multiple parties. Participants have a shared understanding of applicable regulations and standard operating procedures for the alarm information management system. The building management system environment includes a blockchain of a blockchain network at its core, and all participants communicate with the blockchain and its network. Transactions are conducted in a streamlined manner in which some or all parties of the environment may add new transactions to the blockchain and some or all parties of the environment may view the transactions maintained by the blockchain. A blockchain of the blockchain network may be, for example, a decentralized ledger of immutable transaction records validated and secured by a network of peer-to-peer nodes. The decentralized ledger may also utilize proof of work to synchronize multiple decentralized nodes, such as a network of peer-to-peer nodes. The potential participants of the building management system environment include, but are not limited to, building manager devices, service supplier devices, component supplier devices, and auditor devices. By utilizing a decentralized ledger that is not fully controlled or managed by any particular party, a broad scope of parties is more likely to trust and participate in the building management system environment.

Of particular interest are critical and important alarms that need to be managed by a building automation system of the building management system environment. For these critical and important alarms, the building automation system may respond by taking appropriate action to diagnose and address the alarms, particularly guiding and recording these appropriate actions. For example, remediation of a given alarm may require work by various trades to be directed by the building automation system. In addition, regulatory agencies such as the U.S. Food and Drug Administration may utilize the building management system environment to audit one or more facilities associated with the building automation system for proof that each significant fault is been addressed with the proper corrective action and recorded as a Compliance Audit trail.

One aspect is an auditor system for a building management system environment comprising a blockchain component and an alarm remediation and auditing device. The blockchain component provides communication between the auditor system and a network of peer-to-peer nodes. The alarm remediation and auditing device provides interaction between the auditor system and one or more user, wherein the alarm remediation and auditing device is further configured to process building information associated with a selected remediation type received from the blockchain component as well as requirement for regulatory compliance. The auditor system accesses transaction records of a decentralized ledger relating to remediation types of the building automation system, reads a first transaction record of a first system and a second transaction record of a second system in the decentralized ledger relating to the remediation type, performs an audit of the first transaction record and the second transaction record of the decentralized ledger relating to the remediation type, and replicates the first transaction provided by the first system and the second transaction record provided by the second system at a local ledger of the auditor system. The transaction records of the decentralized ledger are immutable. The auditor system performs the audit of the first transaction record and the second transaction record of the decentralized ledger relating to the remediation type without providing any new transaction records to the decentralized ledger that relate to the remediation types of the building automation system and do not relate to the audit.

Another aspect is a method of alarm remediation and auditing for a building management system environment. Transaction records of a decentralized ledger relating to remediation types of the building automation system are accessed, in which the transaction records of the decentralized ledger are immutable. A first transaction record of a first system and a second transaction record of a second system in the decentralized ledger relating to the remediation type are read. An audit of the first transaction record and the second transaction record of the decentralized ledger relating to the remediation type is performed. The first transaction provided by the first system and the second transaction record provided by the second system are replicated at a local ledger of the auditor device. The audit of the first transaction record and the second transaction record of the decentralized ledger relating to the remediation type is performed without providing any new transaction records to the decentralized ledger that relate to the remediation types of the building automation system and do not relate to the audit.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
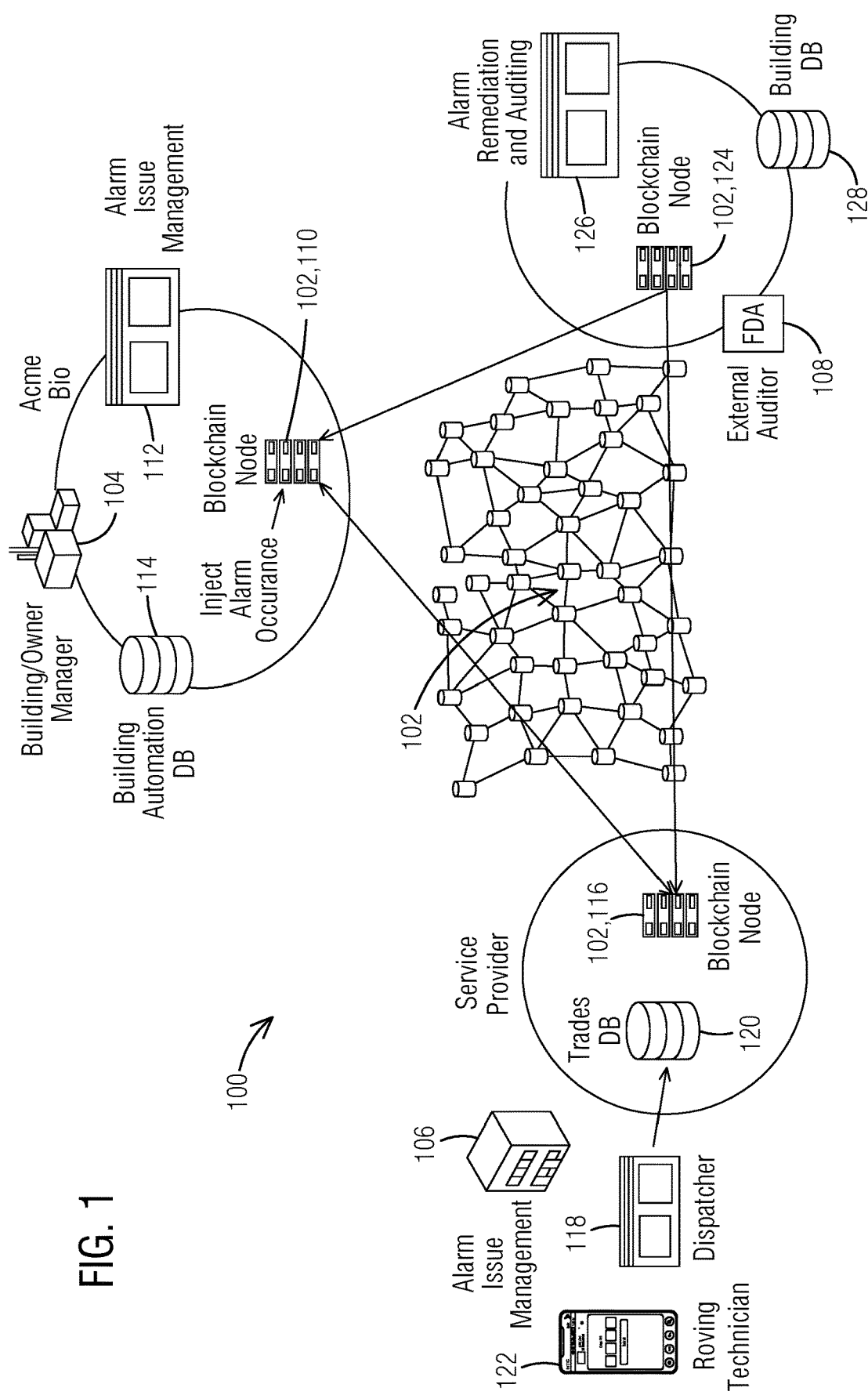
FIG. 1 illustrates schematically an example building management system environment including a building automation system, a service provider system, and an external auditor system in accordance with the present invention.

To facilitate an understanding of embodiments, principles, and features of the present invention, they are explained hereinafter with reference to implementation in illustrative embodiments. In particular, they are described in the context of an alarm issue management system for a building management system environment. Embodiments of the present invention, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

By using a blockchain of a blockchain network and related applications, all participants have a visible, shared understanding of current, applicable standard operating procedures for the alarm issue management system. The building management system environment includes a blockchain that may be based on an internet protocol enabling trust across multiple parties by secure, auditable recording of transactions and events. Blockchain technology is a suitable basis to provide solutions answering the general call in the market for greater transparency and openness. Also, the value of a blockchain increases based on the number of participants. The blockchain becomes more valuable due to its shared visibility across network participants. Thus, the building management system environment supported by the blockchain benefits from greater participation and self-reinforcement. The building management system environment also benefits from inherent efficiencies facilitated by the blockchain which requires minimal oversight, middlemen, and duplication of efforts.

The building management system environment may utilize a blockchain to implement a system for tracking, managing, and addressing alarm occurrence and artifacts of service records. The blockchain allows multiple party participation in alarm corrective procedures and preserve information that may serve as documentation for regulatory bodies. The building management system environment opens-up alarm and service records to a more public, but still protected, ledger and promotes efficient interaction and processing by participants. In addition to building control processes being visible to the outside, the state of service process may be accessed as well and serve as a basis for management of service actions and compliance audit trails.

Various entities may participate within the building management system environment. A building manager may operate a highly regulated facility, such as a pharmaceutical manufacturing facility. The building manager may use an alarm information management system to identify problems, when they arise, that need to be remediated in order to comply with regulatory standards. A tradesperson may execute remediation procedures for building managers, in response to problems identified by an alarm information management system. Examples of work that may be performed by a tradesperson include, but are not limited to, cleaning up hazardous material spill or repairing a cooling system in response to an identified temperature malfunction. An auditor may work for a governing body, such as the U.S. Food and Drug Administration ("FDA"), to verify that the other parties, such as building managers and tradespeople who performing work for the building managers, maintain compliance for applicable standards or regulations.

Referring to FIG. 1, there is illustrated an example building management system environment 100 for implementing an alarm issue management system. The building management system environment 100 includes a blockchain network 102 that is a core part of multiple peer-to-peer nodes. In particular, the building management system environment 100 may include a variety of blockchain components, such as blockchain nodes, interacting with each other to form the blockchain network 102. For the embodiment shown by FIG. 1, the blockchain components include the blockchain nodes of a first system 104, a second system 106, and a third system 108. Examples of the peer-to-peer nodes include, but are not limited to, nodes of a building automation system, a service provider system, and an external auditor system as shown in FIG. 1. The blockchain network 102 includes a decentralized ledger of immutable transaction records, such as a blockchain, that are validated and secured by the network of peer-to-peer nodes. The decentralized ledger of the blockchain network 102 may utilize a process referred to as "proof of work" to synchronize multiple decentralized nodes, such as the network of peer-to-peer nodes. For proof of work, transactions are confirmed and new blocks for the chain are produced by allowing miners to compete against each other to complete transactions of the blockchain network 102. Competition among the miners may facilitate confirmation of transactions and arrangement of the blocks for the blockchain network 102.

As shown in FIG. 1, the nodes of the blockchain network 102 of the example building management system environment 100 include, but are not limited to, a first system 104 represented as a building automation system, a second system 106 represented as a service provider system, and a third system 108 represented as an external auditor system. It is to be understood that the first, second, and third systems 104, 106, 108 shown in FIG. 1 are not limited to individual systems, and they may represent groups or classes of first, second, and third systems. The first system 104, the second system 106, and the third system 108 may be configured to access the transaction records of the decentralized ledger relating to remediation types of the building automation system. For example, the first system 104 or other similar systems may determine remediation types at the building automation system based on alarm signals and upload transaction records to the blockchain of the blockchain network 102 associated with the remediation types. Similarly, the second system 106 may create and upload additional transaction records associated with the remediation types to the blockchain, subsequent to the upload or uploads by the first system 104. The first, second, and third system 104, 106, 108 will be capable of accessing these transaction records relating to the remediation types of the building automation system at the decentralized ledger. In this manner, the blockchain technology provides transparent and open access to the participants of the building management system environment 100.

While access is transparent and open, each individual system is capable of limiting its ability to submit transactions records relating to each remediation type to the decentralized ledger of the example building management system environment 100. In the alternative, a security or management layer may be added to the building management system environment, at each individual system level or at the environment access level, in order to manage the capability of systems to submit transaction records to the decentralized ledger. The first system 104 may be capable of providing new transaction records, such as a first transaction record, for the decentralized ledger relating to new and existing remediation types of the building automation system. For example, the first system 104 may be a building automation system, or a portion thereof, that detects an alarm signal at the building automation system and determines the remediation type at the building automation system based on the alarm signal. For some embodiments, the second system 106 may be a service provider system capable of reading transactions records of the decentralized ledger, such as the first transaction record, that have been provided by the first system and relate to the remediation type. The second system 106 may be capable of creating new transaction records for the decentralized ledger, such as a second transaction record, relating to existing remediation types as created by the first system 104. The second system 106 may forego or restrict creation of any new transaction records for non-remediation types since, unlike the first system, the second system is not included as part of the building automation system. For some embodiments, the third system 108 may be an auditor system capable of reading transaction records of the decentralized ledger that have been created by the first system and the second system. The third system 108 may forego or restrict the capability of creating new transaction records for the decentralized ledger, whether they relate to existing remediation types or non-remediation types, regardless of whether the transaction records are created by the first system 104 or the second system 106.

Still referring to FIG. 1, each of the first, second, and third systems 104, 106, 108 of the example building management system environment 100 may include one or more devices. For example, the first system 104 may include a blockchain component (such as a blockchain node 110), an alarm issue management device 112, and a building automation database 114. The blockchain node 110 is a node of the blockchain network 102, and the blockchain node may provide communications between the first system 104 and the blockchain of the blockchain network, such as providing a service request to the blockchain and receiving a service request and/or a service acceptance from the blockchain. The alarm issue management device 112 may provide interaction between the first system 104 and one or more users of the building management system. The alarm issue management device 112 may also process alarm-related issues, such as determining a remediation type based on a detected alarm signal and/or updating the building automation system to indicate that the remediation type is resolved in response to receiving a service completion by the blockchain node 110. The building automation database 114 may store information relating to various remediation types such as trade type, skill level, or geographic location.

For some embodiments, the first system 104 may be a building automation system for management of security, fire safety, lighting, and/or heating, ventilation, and air conditioning ("HVAC") systems of a facility. The alarm issue management device 112 of the first system 104 may be, in whole or in part, a centralized control station that monitors and controls various field devices dispersed throughout the facility, such as controllers, sensors, and actuators. The building automation system may be configured to access transaction records of the decentralized ledger relating to a remediation type of the building automation system. The remediation type is a particular category among a plurality of predetermine categories for identifying a classification of restoration or reparation process desired for the first system 104 in response to undesirable or unexpected building event. An example of a remediation type is an alarm type triggered by a detected alarm event occurring at a facility, such as security alarm, a fire alarm, and a HVAC malfunction.

As another example, the second system 106 may include a blockchain component (such as a blockchain node 116), an alarm issue management device 118, and a trades database 120. The blockchain node 116 may provide communications between the second system 106 and the blockchain of the blockchain network 102, such as receiving a service request from the blockchain and providing a service request and/or a service acceptance to the blockchain. The alarm issue management device 118 may provide interaction between the second system 106 and one or more users of the building management system. The alarm issue management device 118 of the second system 106 is similar to the alarm issue management device 112 of the first system 104, but the devices may include different features and capabilities, such as differing capabilities to submit transactions records relating to each remediation type, due to the fact that the first system is operated by a building manager and the second system is operated by a dispatcher of a service provider. The trades database 120 may store information relating to various personnel and equipment of the service provider that may have characteristics matching the requirements of each remediation type, such as trade type, skill level, or geographic location. The second system 106, as well as the first system 104, may further include an interface to communicate with mobile devices 122 to interact with a tradesperson, such as a roving technician, and receive status information relating to the tradesperson, such as the trade type of the tradesperson, the skill level of the tradesperson, or the geographic location of the tradesperson.

As a further example, the third system 108 may include a blockchain component (such as a blockchain node 124), an alarm remediation and auditing device 126, and a building database 128. The blockchain node 124 may provide communications between the third system 104 and the blockchain of the blockchain network 102, such as receiving about building information associated with select remediation types from the blockchain. The alarm remediation and auditing device 126 may provide interaction between the third system 108 and one or more auditors associated with a regulatory agency. The alarm remediation and auditing device 126 may also process the building information associated with the select remediation types received from the blockchain. The building database 128 may store the building information associated with the select remediation types received from the blockchain as well as related information such as requirements for regulatory compliance as well as historical information associated with previous audits of the corresponding building automation system.

Figure 2:
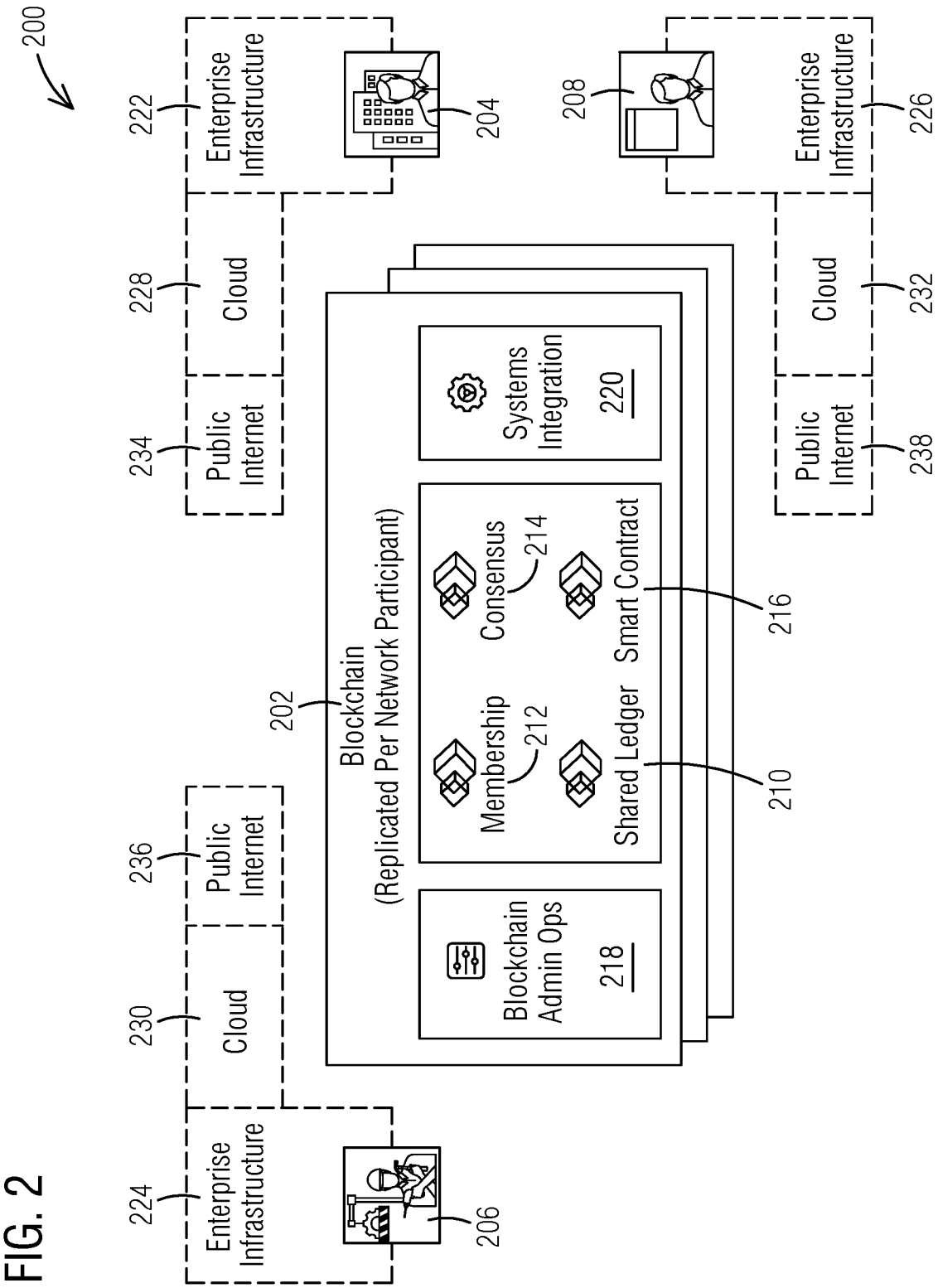
FIG. 2 is a block diagram representing an example building management system environment illustrating a blockchain of a blockchain network in accordance with the present invention.

Referring to FIG. 2, there is shown a block diagram representing an example building management system environment 200 illustrating a blockchain of a blockchain network 202. The building management system environment 200 may include a first system 204, a second system 206, and a third system 208. For example, a building manager, a tradesperson/craftsperson, and an auditor may receive information from the blockchain network 202. For some embodiments, the building manager may create and track information in the blockchain network 202, the tradesperson/craftsperson may update may the information in the blockchain network, and the auditor may review the information in the blockchain network.

As shown in the middle of FIG. 2, the blockchain network 202 illustrates the operations of the network, such as the shared information, contracts, participants, and/or regulators of transactions. The blockchain network 202 of the building management system environment 200 may include various components that are replicated for each participant of the network. In particular, the blockchain network 202 may include a shared ledger 210, membership data 212, consensus information 214, and smart contracts 216. The shared ledger 210, for example, may be a distributed, immutable ledger, such as a blockchain, that is distributed by global network of nodes so that there is no central point of failure. The shared ledger 210 includes current and historical transaction records submitted by first and second systems 204, 206 of the building management system environment 200. In being immutable, the shared ledger 210 includes encryption, digital signatures, and/or hashing to cause any tampering with the shared ledger to be obvious to other participants of the building management system environment 200. The membership data 212 of the blockchain network 202 may provide profile information about individual members or groups of members, such as access privilege for a particular member or a class of members. The consensus information 214 of the blockchain network 202 provides for agreement amongst the network nodes and/or participants to verify committed transactions, thus removing any need for an intermediary to validate and authorize transactions. In addition, the decentralized ledger utilizes proof of work to synchronize decentralized nodes. In particular, the proof of work allows other nodes to verify the validity of a block by checking that the hash of data associated with the block is less than a predetermined number. The smart contracts 216 of the blockchain network 202 provides agreement or a set of rules to govern a business transaction, such as rules for what may be added to the immutable ledger. The blockchain network 202 may also include admin & operations 218 and systems integration components 220 to manage other general operations of the blockchain network.

Each participate of the building management system environment 200, including the first system 204, the second system 206, and the third system 208, may include one or more devices to operate and communicate with the blockchain of the blockchain network 202. In particular, each system 204, 206, 208 may include an enterprise infrastructure 222, 224, 226 to support operations of a building automation system. For example, each enterprise infrastructure 222, 224, 226 may include building devices, building applications, and an enterprise database to manage operations of a building heating, ventilation, and air conditioning ("HVAC") system of a particular building or group of buildings and provide access to the building automation system corresponding to the HVAC system to one or more users. Each system 204, 206, 208 may also include a cloud component 228, 230, 232 to provide access to the blockchain network 202 to the enterprise infrastructure 222, 224, 226. For example, each system 204, 206, 208 may include application servers and Application Programming Interfaces ("API's") to provide communications with the blockchain network 202. Each system 204, 206, 208 may further include a public internet component 234, 236, 238 to provide access to the other networks to the enterprise infrastructure 222, 224, 226. For example, each system 204, 206, 208 may include applications and devices to provide communications with the Internet and/or World Wide Web. It should be noted that each enterprise infrastructure 222, 224, 226 may communicate with the blockchain network 202, the corresponding cloud component 228, 230, 232, and/or the corresponding public internet component 234, 236, 238 via a secure gateway to enable secure access to data and applications across the corresponding environments. Similarly, each enterprise infrastructure 222, 224, 226 may communicate with the corresponding cloud component 228, 230, 232 and/or the corresponding public internet component 234, 236, 238 via one or more firewalls to enable secure access to data and applications across the corresponding environments.

Figure 3:
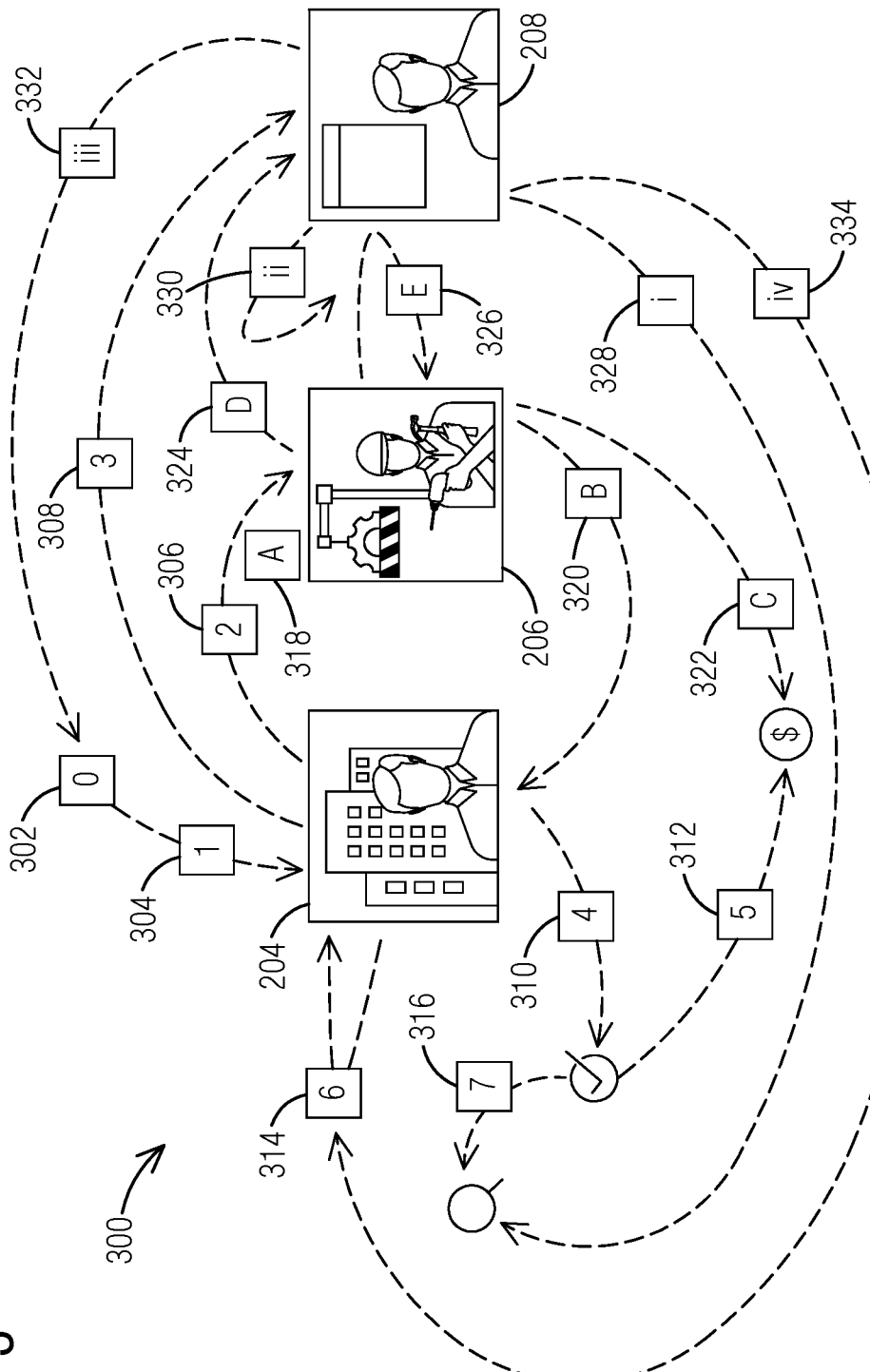
FIG. 3 is a flow diagram illustrating example operations of a building automation system, a service provider system, and an external auditor system for a building management system environment in accordance with the present invention.

Referring to FIG. 3, there is represented an example operation of a first system 204 (e.g., building automation system), a second system 206 (e.g., service provider system), and a third system (e.g., external auditor system) for a building management system environment. The alarm issue management system of a first system 204 for a building management system environment may detect 302 an alarm signal at the first system 204 during operation. The alarm issue management system may next verify 304 that an action needs to be taken by the first system 204 in response to detecting the alarm signal. In particular, the alarm issue management system may determine a remediation type at the first system 204 based on the alarm signal. As a result of receiving the alarm signal and/or determining the remediation type, the first system 204 may solicit 306 services from one or more second systems. For example, the first system 204 may provide a service request to the second system via the blockchain network. Also, subsequent to receiving the alarm signal and/or determining the remediation type, the first system 204 may keep 308 records of the detected alarm at the blockchain network for future possible audit by a third system. The first system 204 may further notify 308 the third system about the alarm to alert them about an opportunity to audit the records.

At some point in the future, after one or more second systems address all issues associated with the alarm, the first system 204 may accept 310 all work as complete and determine that the alarm is resolved. The first system 204 may process 312 accounts payable to the appropriate second system or systems for the work associated with the alarm in response to resolution of the alarm. It should be noted that the first system 204 may also process ongoing general costs that may be incurred, such as costs associated with knowledge of current regulations and remediation of standard operating procedures. The first system 204 may further have 316 follow-up activities and/or costs relating to a specific transaction associated with the alarm subsequent to resolution of the alarm.

The alarm issue management system of a second system 206 for a building management system environment may identify a solicitation by the first system 204 at the blockchain network. The notification may be received by the second system 206 as a result of solicitation 306 of services by the first system 204. The second system 206 may rely 318 on this notification from a potential first system 204 for possible work to be performed. For example, the notification may be received from or via the blockchain network and include service information associated with a service request by the first system 204. If the second system 206 would like to accept the opportunity, then the second system may provide a service acceptance to the blockchain network. The first system 204 may identify 320 the service acceptance at the blockchain network and, if competitive, then the first system may award a work contract to the second system 206. The second system 206 may mobilize a skilled worker or team of skilled workers to perform remediation work at the building or buildings associated with the first system 204 in response to identifying an indication at the blockchain network that it has been awarded the work contract. The second system 206 collects 322 payment for services rendered upon completion and acknowledgement of the remediation work.

Similar to the first system 204, the second system 206 may keep 324 records of the services rendered at the blockchain network for future possible audit by a third system. The second system 206 may further notify 324 the third system about the services rendered to alert them about an opportunity to audit the records. The second system 206 may also process 326 ongoing general costs that may be incurred, such as costs associated with knowledge of current regulations and remediation of standard operating procedures.

The alarm issue management system of a third system 208 for a building management system environment may perform an audit process of the records provided to the blockchain network by the first and second systems 204, 206. The third system 208 may inspect 328 compliance for one or more specific transactions. The third system 208 may also verify 330 that the second system 206 and its associated personnel maintained adequate knowledge, permissions, and qualifications to perform the work. The third system 208 may further verify 332 that the first system 204 and its associated personnel adequately monitored the alarm condition for potential building issues. The third system 208 may still further verify 334 that the first system 204 and its associated personnel maintained adequate understanding of regulations. It should be noted that the third system 208 may note any indications of limited visibility and process redundancies during the audit.

Figure 4:
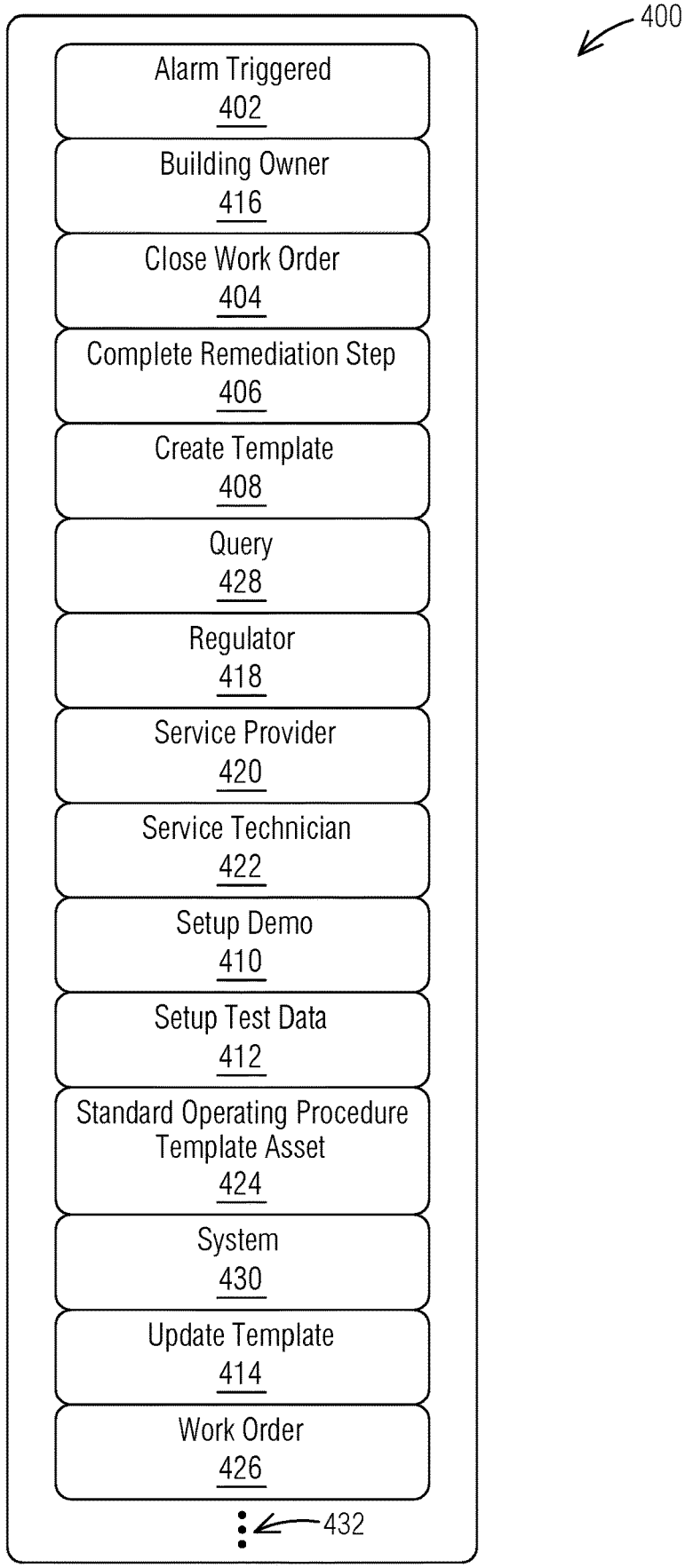
FIG. 4 is a block diagram representing an example data structure for a decentralized ledger of a blockchain network in accordance with the present invention.

FIG. 4 is a block diagram representing an example data structure 400 for a decentralized ledger of a blockchain network, such as the blockchain of the blockchain network 102, 202. The data structure 400 includes multiple classes of transactions stored in the decentralized ledger. It should be understood that the classes of transactions shown in FIG. 4 are examples, and the classes that may be stored in the decentralized ledger are not limited to those shown in FIG. 4. The data structure 400 may include different groups of classes such as classes for transaction types, classes for participant types, classes for asset types, and general types. Examples of classes for transaction types include, and are not limited to, alarm triggered 402, close work order 404, complete remediation step 406, create template 408, setup demo 410, setup test data 412, and update template 414. For example, the class for alarm triggered 402 may be associated with a transaction of a particular work order in progress. Examples of classes for participant types include, and are not limited to, building owner 416 (associated with building automation systems), regulator 418 (associated with auditors), service provider 420, and service technician 422 (associated with a particular service provider). For example, the class for building owner 416 may be associated with a catalogue of building owners and/or managers, and the class for regulator 418 may be associated with a catalogue of auditors, regulators, or government agencies. Examples of classes for asset types include, and are not limited to, standard operating procedure template 424 and work order 426. Examples of general types include, and are not limited to, queries 428 and system 430. Other classes 432 for transaction types may also be represented. Each time a new alarm is detected, a particular template is identified and associated, such as a spill cleanup in response to a spill, fumigation in response to a quality issue, or replacement of a smoke detector in response to a device malfunction.

Figure 5:
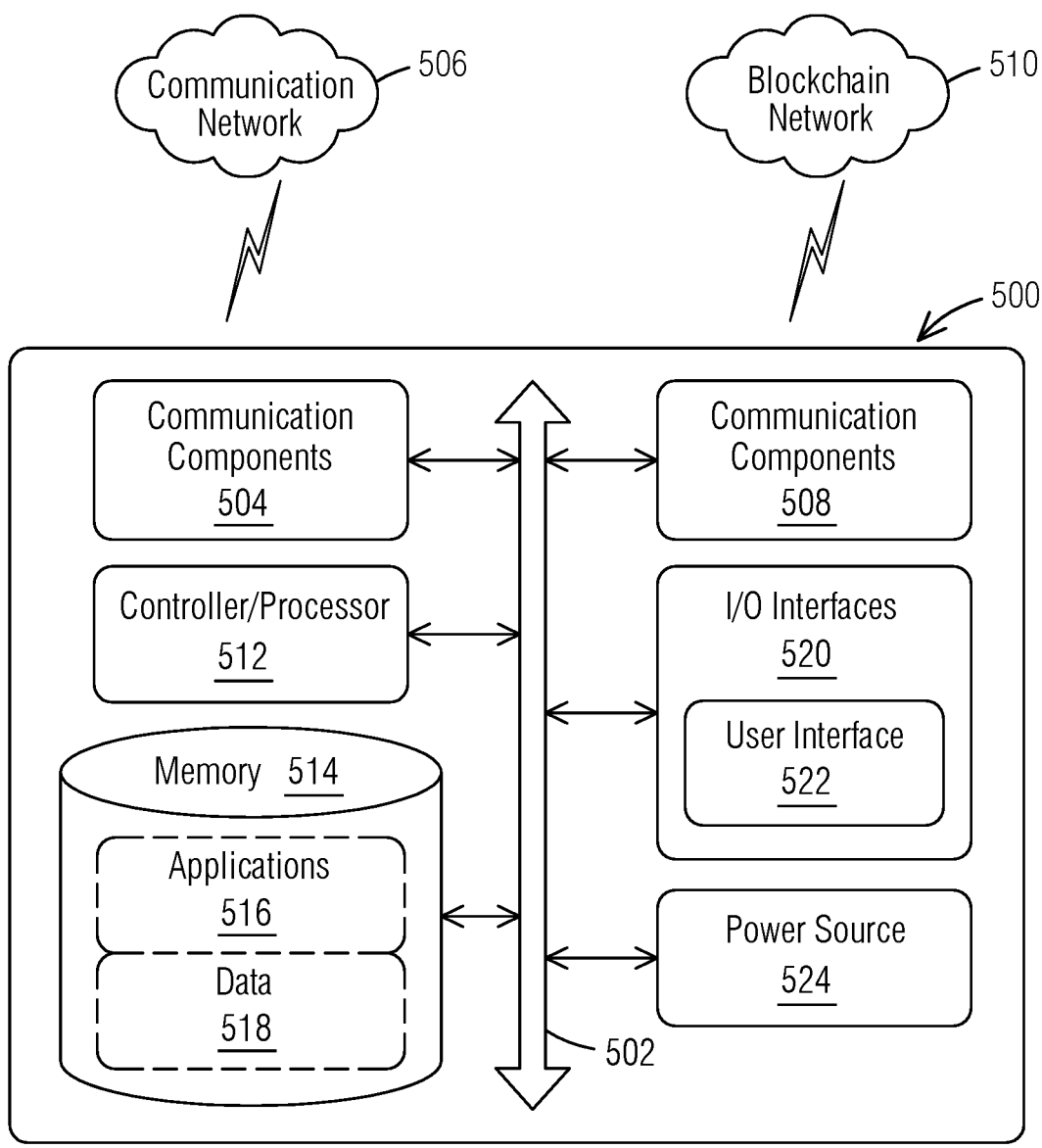
FIG. 5 is a block diagram of example components representing each of a building automation system, a service provider system, or an external auditor system for a building management system environment in accordance with the present invention.

FIG. 5 is an example representation of the various device components 500 of the first system 104, 204, the second system 106, 206, and the third system 108, 208, for a building management system environment 100, 200. Each system 104, 106, 108, 204, 206, 208 may be an individual or group of servers, an individual or group of workstations, an individual or group of remote devices, or any combination of these devices for management and control of one or more aspects of a system for a participant of the building management system environment 100, 200. The device components 500 of each system 104, 106, 108, 204, 206, 208 comprise one or more communication components 504 communicating with other entities via a wired or wireless network 506, one or more blockchain components 508 communicating with the blockchain of the blockchain network 510 (such as blockchain networks 102, 202), one or more controllers or processors 512, and one or more memory components 514. The communication component 504 of the example device components 500 may utilize wireless technology for communication, such as, but are not limited to, satellite-based and cellular-based communications and their variants as well as wireless local area network (WLAN) communication and their variants, such as infrastructure, peer-to-peer, ad hoc, bridge, and wireless distribution-based communications. Examples of WLAN communications include, but are not limited to, IEEE 802.11 (Wi-Fi), IEEE 802.16 (WiMAX), Bluetooth, BLE, and ZigBee Wireless communications may further include other forms of communication such as microwave or infrared technology (IR). The communication component 504 of the example device components 500 may also utilize, in addition to or in the alternative, wired technology for communication, such as transmission of data over a physical conduit. e.g., an electrical cable or optical fiber cable.

The processor 512 may execute code and process data received from, or to be provided to, other components of the device components 500, such as information communicated with the communication component 504, communicated with the blockchain component 508, or stored at the memory component 514. The code associated with each system 104, 106, 108, 204, 206, 208 and stored by the memory component 514 may include, but is not limited to, operating systems, applications 516, data 518, and the like. An operating system includes executable code that controls basic functions of the system 104, 106, 108, 204, 206, 208, such as interactions among the various components of the device components 500, communication with external devices via the communication component 504, communication with the blockchain of the blockchain network 510, and storage and retrieval of code and data to and from the memory component 514. Each application 516 includes executable code to provide specific functionality for the processor 512 and/or remainder of each system 104, 106, 108, 204, 206, 208. Examples of applications 516 executable by the processor 512 and stored by the memory component 514 include, but are not limited to, an alarm issue management application of a building automation system, an alarm issue management application of a service provider system, an alarm remediation and auditing application of an auditor system, and a security or management layer for interaction with the decentralized ledger of the blockchain network 510. Data 518 is information that may be referenced and/or manipulated by an operating system or application for performing functions of each system 104, 106, 108, 204, 206, 208. Examples of data 518 accessible by the processor 512 and stored by the memory component 514 may include, but are not limited to, information associated with the multiple classes of transactions the data structure 400 stored in the blockchain network.

The device components 500 of each system 104, 106, 108, 204, 206, 208 may further comprise one or more input and/or output components (I/O interfaces) 520. The I/O interfaces 520 of the device components 500 may include a variety of video, audio, and/or mechanical components. The I/O interfaces 520 of each system 104, 106, 108, 204, 206, 208 may comprise one or more user interfaces 522 for interaction with users of each system 104, 106, 108, 204, 206, 208. The user interfaces 522 may include a combination of hardware and software to provide a user with a desired user experience. For example, the user interfaces 522 may include one or more input components to allow the user to enter information and one or more output components to provide information to the user. Although the user interfaces 522 may include all input components and all output components of the I/O interfaces 520, the user interfaces may also be directed to a specific subset of input components and/or output components.

The processor 512, one or more applications 516, and one or more input and/or output components may operation cooperatively to provide features for supporting the alarm issue management system. For example, the processor 512 may operate interactively with one or more input components to scan the first system 104, 204 and/or the second system 106, 206, for events or related data associated with a remediation type. The processor 512 and application 516 may provide appropriate transaction records to the decentralized ledger via the communication component 504. Examples of event or related data include, but are not limited to, work order statuses, such as the completion of a work order.

The device components 500 may further comprise a power source 524, such as a power supply or a portable battery, for providing power to the other device components 500 of each system 104, 106, 108, 204, 206, 208 of the building management system environment 100, 200.

It is to be understood that FIG. 5 is provided for illustrative purposes only to represent examples of the device components 500 of each system 104, 106, 108, 204, 206, 208, and is not intended to be a complete diagram of the various components that may be utilized by the systems. Therefore, each system 104, 106, 108, 204, 206, 208 may include various other components not shown in FIG. 5, may include a combination of two or more components, or a division of a particular component into two or more separate components, and still be within the scope of the present invention.

Figure 6:
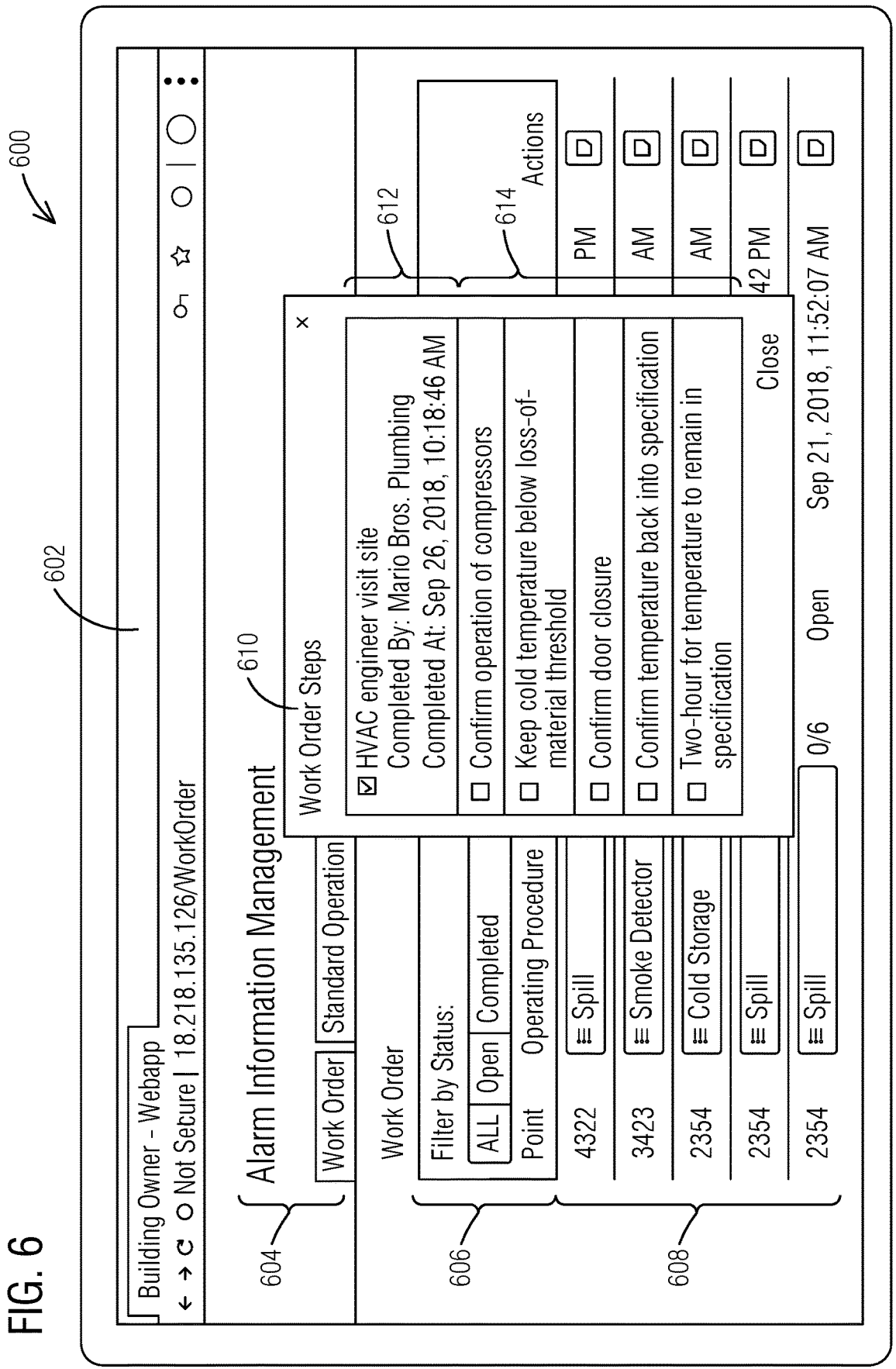
FIG. 6 is a display view of an example building automation system for a building management system environment in accordance with the present invention.

Referring to FIG. 6, there is shown an alarm issue management application 600 of a first system 104 for the building management system environment 100, 200. The alarm issue management application may be a web application for a building automation system. The alarm issue management application 600 includes or generates a window 602 to display operations, tracking progress, compliance, and other events of the buildings managed by the building automation system. As shown in FIG. 6, the window 602 of the alarm issue management application 600 may include a header 604 having status information as well as feature selections for operation of the application. The window 602 shown in FIG. 6 may also provide controls 606 for managing work orders associated with a remediation type as well as a list of work orders 608. For example, the controls 606 may allow a user to select filtering and/or sorting options for some or all of the work orders identified by the window 602. The window 602 of the alarm issue management application 600 may also include a view of multiple work orders 608 that may be open and/or completed for a building automation system. The work orders 608 may include, but are not limited to, a point identification associated with a point of the building automation system for each work order, a description of each work order, a quantification of the tasks completed for each work order, a quantification of the total tasks for each work order, a status for each work order, a time identifier for each work order (such as a work order creation or work order completion date and/or time), and one or more actions for each work order that may be performed by the alarm issue management application 600.

The description of each work order may include an operating procedure category for each work order. For some embodiments, the work orders 608 of the window 602 may include work orders that have been provided to a service processing center of a particular site associated with the building automation system. As such, the appropriate operating procedure for addressing each work order may be determined by the service processing center or other entity associated with the building automation system. For example, some work orders may be associated with hazardous spills, some may be associated with a less-than-optimal operation of a device (such as a smoke detector), some may be associated with a temperature violation of a storage area in a regulated facility, and the like, thus the appropriate operating procedure may be determined.

The window 602 of the alarm issue management application 600 may also include or generate a view to the work order steps or tasks 610 involved with bringing each work order 608 to completion and/or view a tradesperson's progress at-a-glance, such as who did what and when as well as the current status of each work order. The work order tasks 610 may be provided in the window 602 or in a separate window as shown in FIG. 6. The work order tasks 610 may be shown with a task header 612 and/or a task list 614. The task header 612 may include status information associated with the applicable work order tasks, such as, for example, a general description of the tasks to be performed for the work order, an identification of the service provider and/or service technician, and a time identifier for each work order task (such as a completion date and/or time). The task list 614 may identify the steps to be addressed and/or completed and the status of each step (such as a check box) to determine whether or not a work order has been completed. For example, if two out of five steps are identified as completed by the task list 614 of the work order tasks 610, then the associated quantification of the tasks completed for the particular work order would be shown at the window 602 as two and the associated quantification of the total tasks for the particular work order would be shown at the window as five. A work order would be considered to be completed if the quantification of tasks completed equals the quantification of total tasks.

Figure 7:
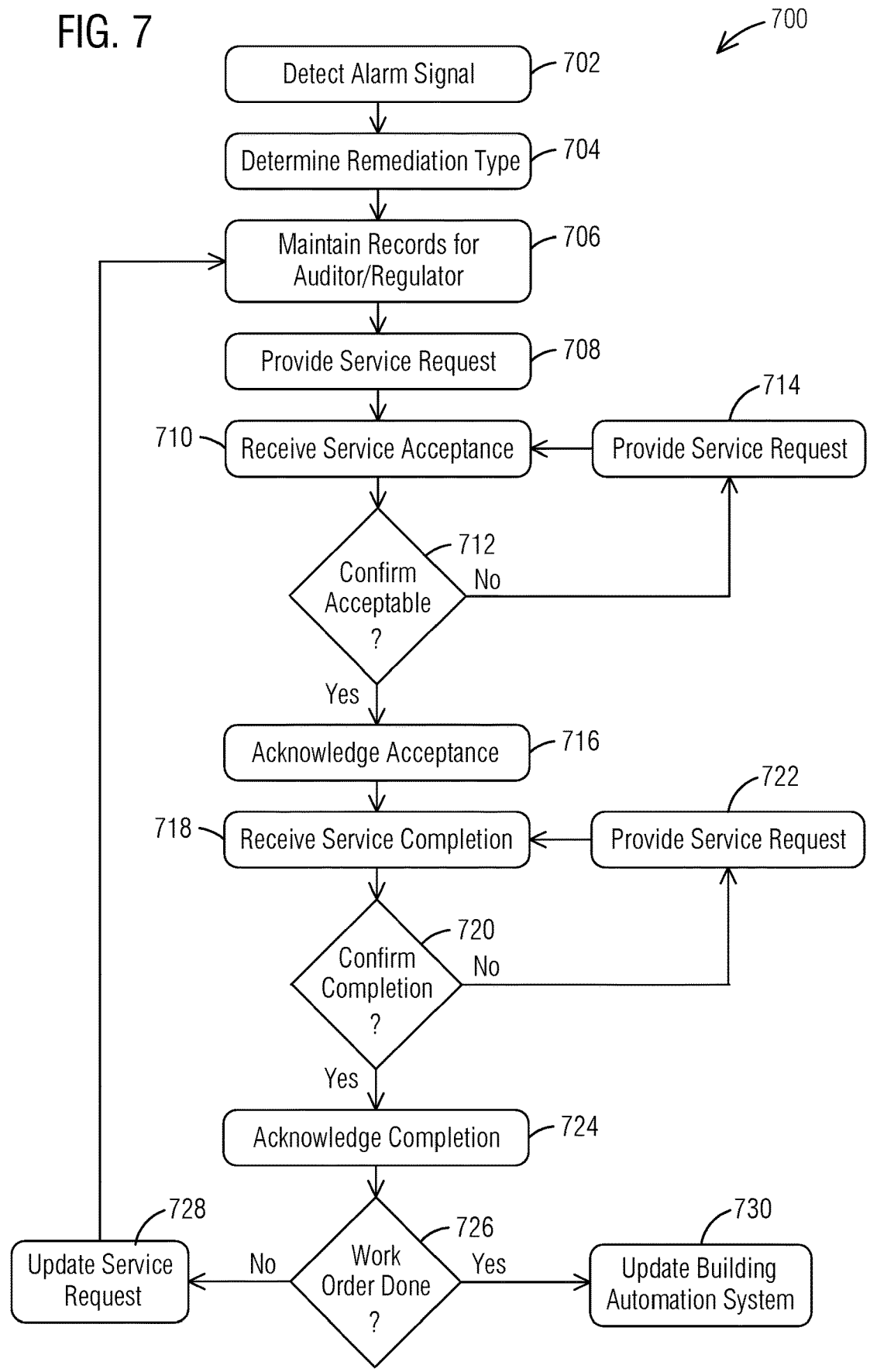
FIG. 7 is a flow diagram illustrating an example operation of a building automation system for a building management system environment in accordance with the present invention.

FIG. 7 illustrates an example operation of a first system 104, 204 for a building management system environment 100, 200. During general operation of a first system 104 that is participating in a building management system environment 100 by communicating with a blockchain of a blockchain network 102, the first system may detect 702 an alarm signal at the building automation system. The first system 104 may be a building automation system or, in the alternative, connected to a building automation system. The first system 104 may determine 704 a remediation type at the building automation system based on the alarm signal. For some embodiments, the remediation type may also identify one or more service entity conditions such as trade type, skill level, or geographic location. The first system 104 may notify an auditor external to the building automation system about the alarm signal, type, and/or information in response to, or at some time subsequent to, detecting the alarm signal or determining the remediation type. In addition, the first system 104 may maintain 706 records of alarm information associated with the remediation type at the building automation system for an audit, subsequent to determining 704 the remediation type. The first system 104 may also maintain a copy of the decentralized ledger of the blockchain network 102 at its memory 514 as a local ledger of the first system. Further, the first system 104 may replicate transaction records, such as a first transaction record provided by the first system and/or a second transaction record provided by the second system 106, at the local ledger of the first system.

After detecting the alarm signal and determining the corresponding remediation type, the first system 104 may provide 708 a service request to or via the blockchain of the blockchain network 102. The first system 104 is configured to access the transaction records of the decentralized ledger relating to a remediation type of a building automation system. The first system 104 may provide a first transaction record to the decentralized ledger relating to the remediation type. An example of the service request may be, but is not limited to, a work order associated with the remediation type. The service request may include multiple work order tasks associated with the remediation type and the service entity condition or conditions identified by the remediation type. By submitting the service request to the blockchain, other entities that view the blockchain for potential work order opportunities may view the service request, for example, as an open work order entry in the decentralized ledger.

Entities, such as one or more second systems 106, may submit a response to or via the blockchain of the blockchain network 102 if they believe that they meet the requirements of the associated service entity condition or conditions. As a result, the first system 104 may receive 710 a service acceptance associated with one or more work order tasks, of the multiple work order tasks included in the service request, from or via the blockchain. The service acceptance may identify one or more accepting service entities. Also, the first system 104 may receive multiple service acceptances associated with the work order task or tasks, particularly if multiple accepting entities submit them to the blockchain, in which case the first system will select a service acceptance among the multiple service acceptances based on an acceptance criteria. The acceptance criteria may be based on the service entity condition or conditions associated with the remediation type such as, but are not limited to, trade type, skill level, and/or geographic location of a service technician or service technicians to be assigned to the work order tasks. The accepting entities may include a service provider or a representative of the service provider, such as a service technician or a service agent.

For the service acceptance that is selected, the first system 104 may determine 712 whether the one or more accepting service entities are acceptable in accordance with the service entity conditions of the service request. If the first system 104 does not confirm that any of the accepting service entities are acceptable in accordance with the service entity conditions of the service request, then the first system may wait 710 for another service acceptance to be submitted to the blockchain of the blockchain network 102. For some embodiments, the first system 104 may provide 714 another service request to the blockchain before waiting 710 for another service acceptance to be submitted to the blockchain. The first system 104 may provide 716 an acceptance approval of the service acceptance to or via the blockchain in response to confirming that the accepting service entity for a particular service acceptance is acceptable in accordance with the one or more service entity conditions.

A second system 106, or a service technician of the second system, may proceed with performing the work order tasks associated with the remediation type in response to receiving the acceptance approval from the blockchain of the blockchain network 102. After completing the work order tasks, the second system 106 or associated service technician may submit a service completion to or via the blockchain. The service completion may include a proof of completion to provide the first system 104 assurance that the work order tasks have been completed. Thus, the first system 104 may receive 718 the service completion associated with one or more work order tasks from or via the blockchain, in which the service completion may include the proof of completion. The proof of completion may include contextual data such as location information, a machine-readable code, or an image associated with the one or more work order tasks. Examples of proof of completion includes, but are not limited to, location information about the assigned service technician, such as a cellular or satellite-based location indicator, a proximity sensor-based location indicator, a code-based indicator (such as reading a QR code), or a captured image or video of the completed work.

In response to receiving the service completion from the blockchain, the first system 104 may determine, and thus confirm, 720 whether the work order tasks have been completed based, at least in part, on the proof of completion received from or via the blockchain of the blockchain network. If the first system 104 does not confirm that the work order tasks have been completed to its satisfaction, then the first system may wait 718 for another service completion to be submitted to the blockchain. For some embodiments, the first system 104 may provide 722 another service request to the blockchain before waiting 718 for another service acceptance to be submitted to the blockchain. The first system 104 may provide a completion approval 724 of the service completion to or via the blockchain in response to confirming that the work order tasks have been completed.

Each time work order tasks are completed, the first system 104 may determine 726 whether all work order tasks associated with a service request (i.e., work order) have been completed. If the first system 104 determines that there are one or more work order tasks of the service request that still need to be addressed, then the first system may provide 728 an updated service request to or via the blockchain of the blockchain network 102. If the first system 104 determines that all work order tasks of the service request have been addressed, then the first system may perform 730 a function in response to receiving the service completion or otherwise determining that the service request has been completed. For example, the first system 104 may update the building automation system in response to receiving, confirming, or acknowledging the service completion, to indicate that the remediation type is resolved.

Figure 8:
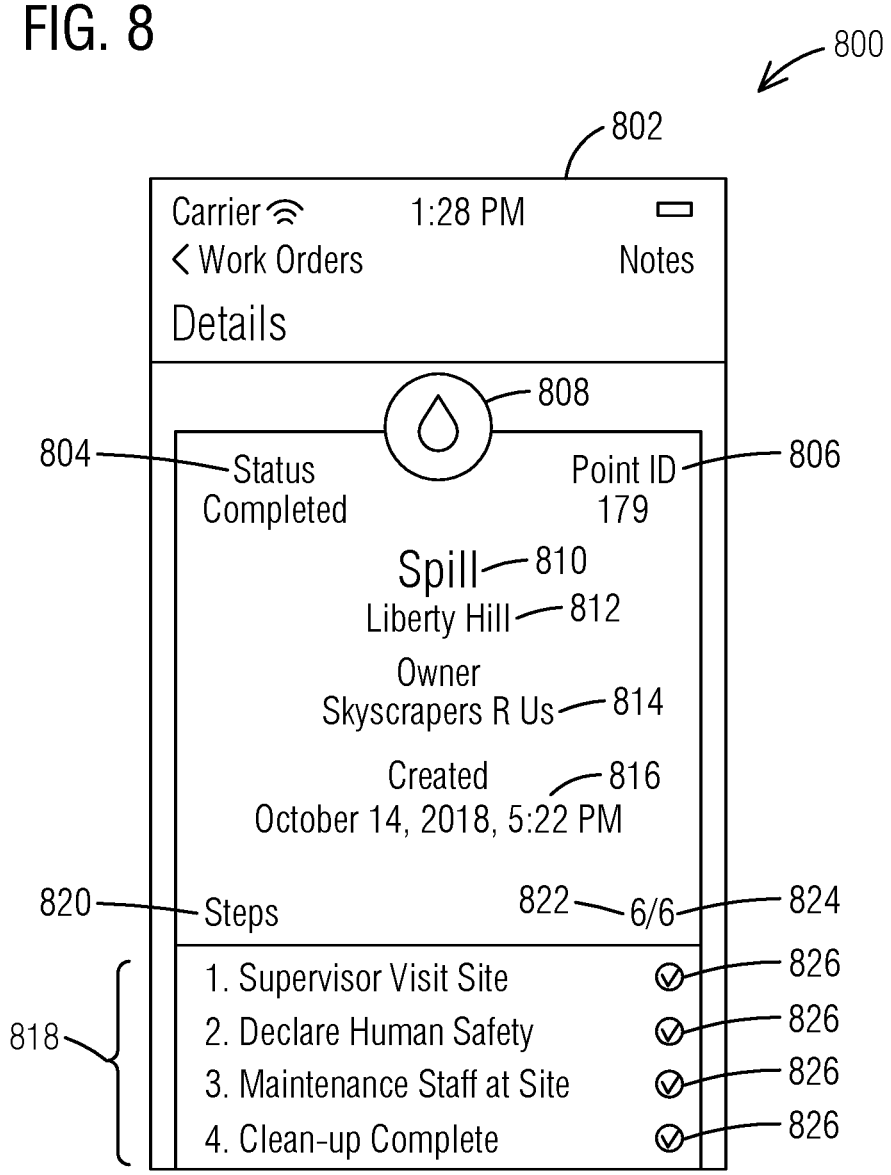
FIG. 8 is a display view of an example servicer provider system for a building management system environment in accordance with the present invention.

Referring to FIG. 8, there is shown an alarm issue management application 800 of a second system 106 for the building management system environment 100, 200. The alarm issue management application may be a mobile application or a web application for a service provider system. For example, the embodiment shown in FIG. 8 is a mobile application, but it is to be understood that the alarm issue management application 800 of the second system 106 may also be a web application similar to the one shown in FIG. 6. By utilizing an alarm issue management application 800, a second system 106 would have visibility to work opportunities, the status of these work opportunities, and viewing and/or sharing notes about these work opportunities.

The alarm issue management application 800 includes or generates a window 802 to display operations, tracking progress, compliance, and/or other events of the buildings associated with the remediation types. The window 802 of the alarm issue management application 800 may include a header that provides general information 804-816 about a service request, i.e., work order, received from or via the blockchain of the blockchain network 102 by the application. For example, the header may include a status 804 of the work order, a point identification 806 associated with a point of the building automation system for the work order, one or more visual indicators 808, and a description of the work order 810. The heading may also include details about the work order, such as a location 812 associated with the remediation type, an identification 814 of the first system 104 associated with the remediation type, and a time identifier 816 for the work order (such as a work order creation or work order completion date and/or time). The visual indicator or indicators 808 may represent one, some, or all of the general information 804-816 provided by the header.

The window 802 shown in FIG. 8 may also provide a list of work order steps or tasks 818 involved with bringing each work order to completion. The work order tasks 818 may be provided in the window 802 as shown in FIG. 8 or in a separate window as shown in FIG. 6. The work order tasks 818 may be shown with a task header 820, 822, 824 and/or a task list 826. The task header may include a general designation 820, a description of the work order (not shown), a quantification 822 of the tasks completed for each work order, and a quantification 824 of the total tasks for each work order. The task list 826 may identify the steps to be addressed and/or completed and the status of each step (such as a check box) to determine whether or not a work order has been completed. For example, if three out of six steps are identified as completed by the task list 826 of the work order tasks 818, then the associated quantification of the tasks completed for the particular work order would be shown at the window 802 as three and the associated quantification of the total tasks for the particular work order would be shown at the window as six. A work order would be considered to be completed if the quantification of tasks completed equals the quantification of total tasks.

Figure 9:
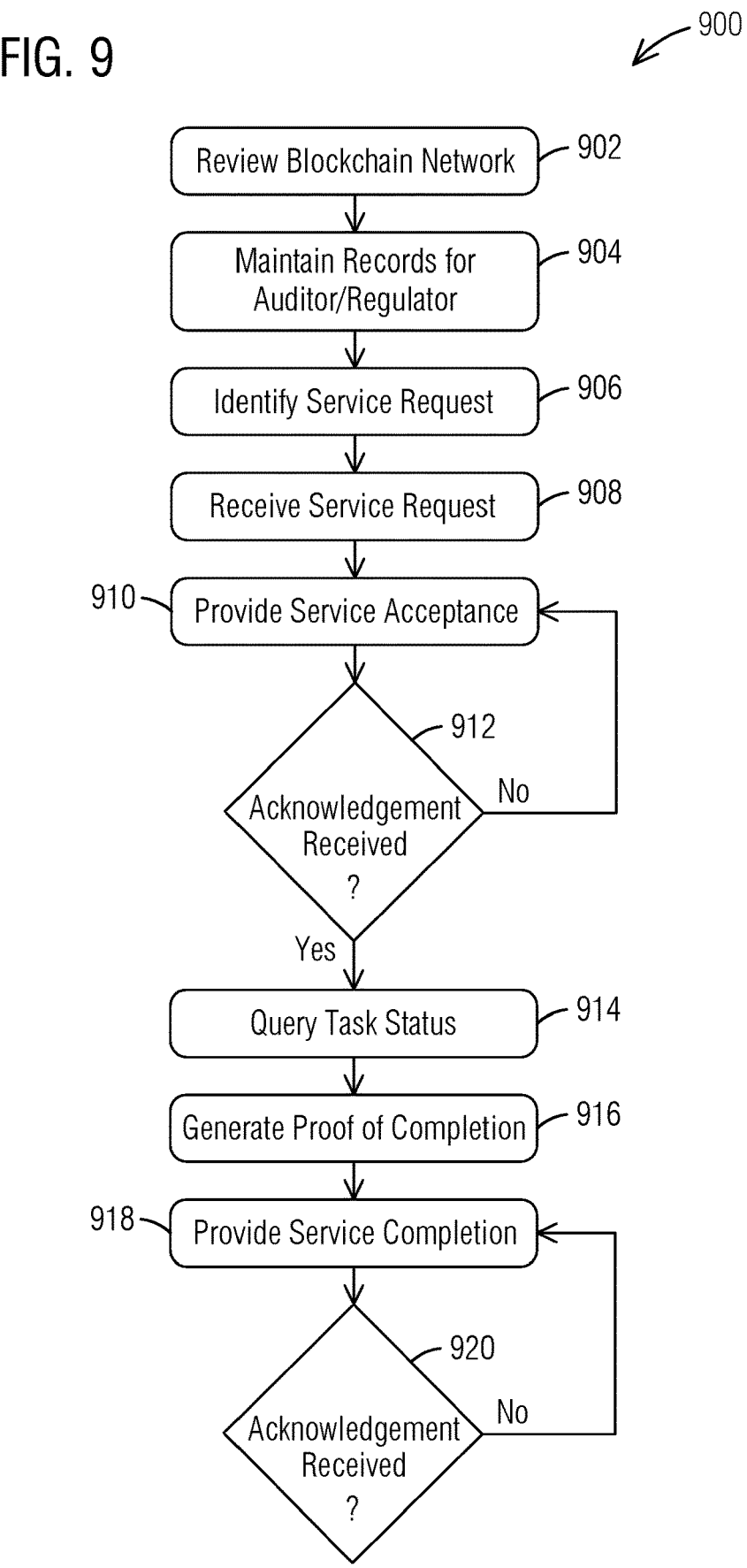
FIG. 9 is a flow diagram illustrating an example operation of a service provider system for a building management system environment in accordance with the present invention.

Referring to FIG. 9, there is illustrated an example operation of an alarm issue management of a second system 106, 206 for a building management system environment 100, 200. The alarm issue management utilizes the blockchain of the blockchain network 102 provide the second system 106 an opportunity to find work opportunities offered by the first system 104. Thus, by reviewing 902 the transactions posted in the ledger of the blockchain network 102 on a periodic basis or continuously, the second system 106 may find work opportunities of interest. The second system may also maintain 904 records of alarm information associated with each remediation type for possible future audit by a third system 108. The second system 106 may also maintain a copy of the decentralized ledger of the blockchain network 102 in its memory 514 as a local ledger of the second system. Further, the second system 106 may replicate transaction records, such as a first transaction record provided by the first system 104 and/or a second transaction record provided by the second system, at the local ledger of the first system.

The second system 106 may browse the transactions in the decentralized ledger of the blockchain network 102 and identify 906 an open or uncompleted service request by a building automation system. The second system 106 may be configured to access the transaction records of the decentralized ledger relating to the remediation types of the building automation system. If the service request is selected by the second system 106, then the second system may receive 908 the service request from or via the blockchain of the blockchain network 102. The service request may include multiple work order tasks associated with a remediation type determined by the building automation system and one or more service entity conditions. The service request may also include additional information such as, but not limited to, the remediation type, the status for each work order task, and the identification of an entity associated with the building automation system. Further, the remediation type may identify one or more service entity conditions such as trade type, skill level, or geographic location. The second system 106 may notify an auditor external to the building automation system about the alarm signal, type, and/or information in response to, or at some time subsequent to, receiving the service request.

After receiving the service request, the second system 106 may decide to accept the service request and provide 910 a service acceptance associated with one or more work order tasks to or via the blockchain of the blockchain network 102. The second system 106 may read the first transaction record of the decentralized ledger relating to the remediation type and provide a second transaction record to the decentralized ledger relating to the remediation type based on the first transaction record provided by the first system 104. If the second system 106 does not receive 912 an acknowledgment of the service acceptance from the blockchain then, for some embodiments, the second system may further wait or provide 910 another service acceptance. For other embodiments, the second system 106 may give-up on the service request and attempt to identify 906 another service request.

A second system 106, or a service technician of the second system, may proceed with performing the work order tasks associated with the remediation type in response to receiving 912 the acceptance approval from or via the blockchain of the blockchain network 102. Also, after receiving the acceptance approval, the second system 106 may query 914 the service technician about the task status of the work order tasks one or more times. In response to completion of the work order tasks, the second system 106 or associated service technician may generate 916 a proof of completion. The proof of completion may include contextual data such as location information, a machine-readable code, or an image associated with the one or more work order tasks. Examples of proof of completion includes, but are not limited to, location information about the assigned service technician, such as a cellular or satellite-based location indicator, a proximity sensor-based location indicator, a code-based indicator (such as reading a QR code), or a captured image or video of the completed work.

In response to generating the proof of completion, the second system 106 or associated service technician may submit or provide 918 a service completion to or via the blockchain of the blockchain network 102. Thus, the second system 106 provides a third transaction record to the decentralized ledger relating to the remediation type to acknowledge completion of service of the alarm type. The service completion may include the proof of completion to provide the first system 104 assurance that the work order tasks have been completed. If the second system 106 does not receive 920 an acknowledgment of the service completion from the blockchain then, for some embodiments, the second system may further wait or provide 918 another service completion. For other embodiments, the second system 106 may attempt to communicate with the first system 104, or an entity associated with the first system, by another means, such as a communication link that does not include or use the blockchain. If the second system 106 receives an acknowledgment of the service completion from or via the blockchain in response to providing the service completion, then the second system 106 may submit a request for payment of services rendered to the first party 104 via the blockchain or by other means.

Figure 10:
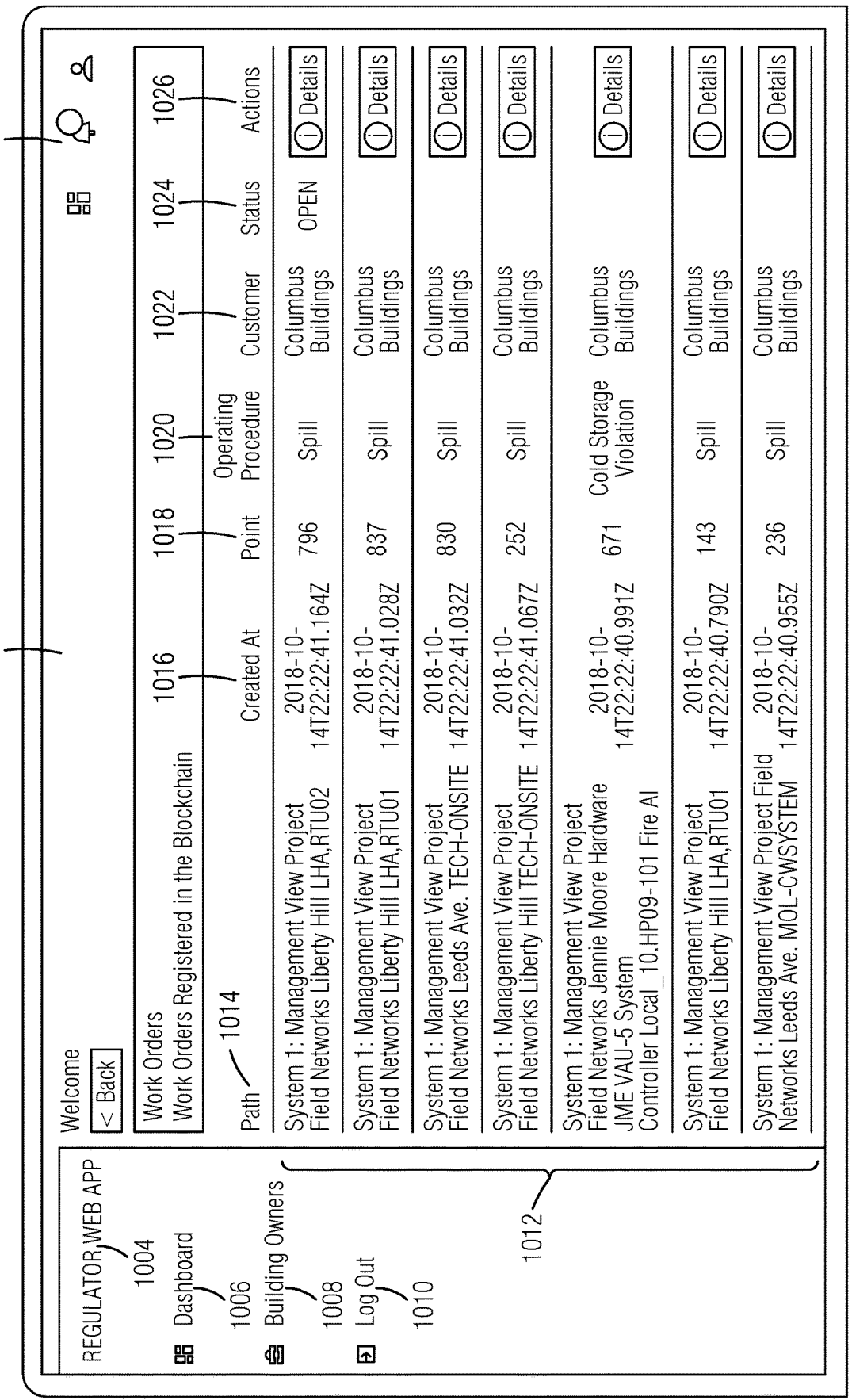
FIG. 10 is a display view of an example auditor system for a building management system environment in accordance with the present invention.

Referring to FIG. 10, there is shown an alarm remediation and auditing application 1000 of a third system 108, 208 for the building management system environment 100, 200. The alarm remediation and auditing application 1000 may be a web application for an auditor. The third system 108 may have visibility and details about all work that has been performed in the first system 104. The third system 108 may have visibility to detailed information about participant activity in which all data related to remediation types are collected and posted in the decentralized ledger of the blockchain network 102. The third system 108 may be configured to access the transaction records of the decentralized ledger relating to the remediation types of the building automation system, in which the third system reads the first transaction record and the second transaction record of the decentralized ledger relating to the remediation type and performs an audit of the first transaction record and the second transaction record of the decentralized ledger relating to the remediation type.

As a participant of the blockchain, the third system 108 may have the capability of reading transaction records of the blockchain network and providing transaction records to the blockchain network. Even so, for some embodiments, the third system 108 may choose to forego or restrict itself to having read-only view of work orders tracked on the decentralized ledger of the blockchain network 102, by utilizing a security or management layer or other technique, as well as viewing all the activity of the blockchain. For these embodiments, the third system 108 may only read data and may not write data, keeping the roles and responsibilities of the network participants separate and clear. Thus, the third system 108 may perform an audit of the first transaction record and the second transaction record of the decentralized ledger relating to the remediation type without providing any new transaction records to the decentralized ledger that relate to the remediation types of the building automation system and do not relate to the audit.

The alarm remediation and auditing application 1000 includes or generates a window 1002 to display operations, tracking progress, compliance, and other happenings of the buildings managed by the building automation system. As shown in FIG. 1000, the window 1002 of the alarm remediation and auditing application 1000 may include a header or toolbar providing feature selections for operation of the application. For example, as shown in FIG. 10, the toolbar of the window 1002 may include a general designation 1004, access to a dashboard 1006, access to building owner/manager information 1008, and an ability logout of the application 1010.

The window 1002 of the alarm remediation and auditing application 1000 may also include a view of multiple work orders 1012 that may be open and/or completed for one or more building automation systems. The work orders 1012 identified by the alarm remediation and auditing application 1000 may include, but are not limited to, a description of each work order 1014, a time identifier for each work order (such as a work order creation or work order completion date and/or time) 1016, a point identification associated with a point of each building automation system for each work order 1018, an operating procedure category 1020 which corresponds to an appropriate operating procedure for addressing each work order, a first or second party 1022 associated with each work order, and a status for each work order 1024. In addition, the work orders 1012 identified by the alarm remediation and auditing application 1000 may further include one or more actions 1026 for each work order that may be performed by the alarm remediation and auditing application 1000. The window 1002 of the alarm remediation and auditing application 1000 may further provide access to other features 1028 that may facilitate an auditor's ability to review an alarm issue management system of a building automation system via the blockchain.

Similar to the first and second systems 104, 106, the third system 108 may also maintain a copy of the decentralized ledger of the blockchain network 102 at its memory 514 as a local ledger of the third system. Further, the third system 108 may replicate transaction records, such as a first transaction record provided by the first system 104 and/or a second transaction record provided by the second system 106, at the local ledger of the third system.

Those skilled in the art will recognize that, for simplicity and clarity, the full structure and operation of all systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of fully functional systems, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. An auditor system for a building management system environment comprising:

a blockchain component configured to provide communication between the auditor system and blockchain components of other systems of a network of peer-to-peer nodes, the network of peer-to-peer nodes validating and securing a decentralized ledger of transaction records and being synchronized by the decentralized ledger using proof of work, the transaction records of the decentralized ledger being immutable;

a processor configured to provide interaction between the auditor system and the other systems of the network of peer-to-peer nodes, and process building information associated with a selected remediation type received from the blockchain component and requirement for regulatory compliance by one or more auditors associated with a regulator agency; and a memory component configured to store a local ledger of the auditor system, wherein the blockchain component accesses transaction records of a decentralized ledger relating to remediation types of the building automation system, wherein the processor reads a first transaction record of a first system and a second transaction record of a second system in the decentralized ledger relating to the remediation type, performs an audit of the first transaction record and the second transaction record of the decentralized ledger relating to the remediation type, and replicates the first transaction provided by the first system and the second transaction record provided by the second system at the local ledger of the auditor system, and wherein the processor performs the audit of the first transaction record and the second transaction record of the decentralized ledger relating to the remediation type without providing any new transaction records to the decentralized ledger that relate to the remediation types of the building automation system and do not relate to the audit.

2. The auditor system as described in claim 1, further comprising a building database configured to store the building information associated with the select remediation types received from the network of peer-to-peer nodes and related information including requirements for regulatory compliance or historical information associated with previous audits of the corresponding building automation system.

3. The auditor system as described in claim 1, wherein the auditor system receives a notification from an alarm issue management system of the building automation system for the building management system environment about an alarm signal, type and/or information.

4. The auditor system as described in claim 1, wherein the auditor system performs an audit process of records provided to the network of peer-to-peer nodes by the first and the second systems.

5. The auditor system as described in claim 1, wherein the auditor system inspects compliance for one or more specific transactions.

6. The auditor system as described in claim 1, wherein the auditor system verifies that the second system and its associated personnel maintained knowledge, permissions, and qualifications to perform the work.

7. The auditor system as described in claim 1, wherein the auditor system verifies that the first system and its associated personnel monitored the alarm condition for potential building issues.

8. The auditor system as described in claim 1, wherein the auditor system verifies that the first system and its associated personnel maintained understanding of regulations.

9. A method of alarm remediation and auditing for a building management system environment comprising the steps of:
- accessing, by a blockchain component of an auditor system, transaction records of a decentralized ledger relating to remediation types of the building automation system, the transaction records of the decentralized ledger being immutable,
- wherein the blockchain component provides communication between the auditor system and blockchain components of other systems of a network of peer-to-peer nodes, the network of peer-to-peer nodes validating and securing a decentralized ledger of transaction records and being synchronized by the decentralized ledger using proof of work;
- reading, by a processor of the auditor system, a first transaction record of a first system and a second transaction record of a second system in the decentralized ledger relating to the remediation type,
- wherein the processor provides interaction between the auditor system and the other systems of the network of peer-to-peer nodes and processes building information associated with a selected remediation type received from the blockchain component, and requirement for regulatory compliance by one or more auditors associated with a regulator agency;
- performing, by the processor, an audit of the first transaction record and the second transaction record of the decentralized ledger relating to the remediation type;
- replicating, by the processor, the first transaction provided by the first system and the second transaction record provided by the second system at a local ledger of the auditor system; and
- performing, by the processor, the audit of the first transaction record and the second transaction record of the decentralized ledger relating to the remediation type without providing any new transaction records to the decentralized ledger that relate to the remediation types of the building automation system and do not relate to the audit.

10. The method as described in claim 9, further comprising storing building information associated with the select remediation types received from a network of peer-to-peer nodes and related information including requirements for regulatory compliance or historical information associated with previous audits of the corresponding building automation system.

11. The method as described in claim 9, further comprising receiving a notification from an alarm issue management system of the building automation system for the building management system environment about an alarm signal, type and/or information.

12. The method as described in claim 9, further comprising performing an audit process of records provided to the network of peer-to-peer nodes by the first and the second systems.

13. The method as described in claim 9, further comprising inspecting compliance for one or more specific transactions.

14. The method as described in claim 9, further comprising determining that the second system and its associated personnel maintained knowledge, permissions, and qualifications to perform the work.

15. The method as described in claim 9, further comprising determining that the first system and its associated personnel monitored the alarm condition for building issues.

16. The method as described in claim 9, further comprising determining that the first system and its associated personnel maintained understanding of regulations.

* * * * *